United States Patent
Kuikka et al.

(10) Patent No.: US 11,520,316 B2
(45) Date of Patent: Dec. 6, 2022

(54) DETERMINING CONTROL PARAMETERS FOR AN INDUSTRIAL AUTOMATION DEVICE

(71) Applicant: ABB Schweiz AG, Baden (CH)

(72) Inventors: Toni Kuikka, Helsinki (FI); Mikko Kohvakka, Helsinki (FI); Zhongliang Hu, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/137,525

(22) Filed: Dec. 30, 2020

(65) Prior Publication Data
US 2021/0232123 A1   Jul. 29, 2021

(30) Foreign Application Priority Data
Jan. 27, 2020   (EP) ..................................... 20153806

(51) Int. Cl.
*G05B 19/418*   (2006.01)
(52) U.S. Cl.
CPC ..... *G05B 19/4185* (2013.01); *G05B 19/4183* (2013.01)
(58) Field of Classification Search
CPC ............ G05B 19/4185; G05B 19/4183; G05B 19/042; G05B 13/042
See application file for complete search history.

(56) References Cited

U.S. PATENT DOCUMENTS

| | | | | |
|---|---|---|---|---|
| 7,143,016 | B1 * | 11/2006 | Discenzo | G05B 13/0265 703/3 |
| 2008/0288115 | A1 * | 11/2008 | Rusnak | F04D 15/0066 700/282 |
| 2011/0076156 | A1 * | 3/2011 | Stiles, Jr. | F04B 49/106 417/42 |

(Continued)

FOREIGN PATENT DOCUMENTS

| | | |
|---|---|---|
| EP | 2618230 A2 | 7/2013 |
| EP | 3147826 A1 | 3/2017 |
| EP | 2618230 A3 | 5/2017 |

OTHER PUBLICATIONS

European Patent Office, Extended Search Report issued in corresponding Application No. 20153806.3, dated Jul. 17, 2020, 9 pp.

*Primary Examiner* — Christopher E. Everett
(74) *Attorney, Agent, or Firm* — Leydig, Voit & Mayer, Ltd.

(57) ABSTRACT

Disclosed is a method including obtaining a graphical representation including information on one or more performance metrics associated with an industrial automation device, determining a target operating point associated with the industrial automation device based at least partly on the graphical representation, obtaining a target reference value and one or more operating limits for the industrial automation device, obtaining operational information associated with usage of the industrial automation device, and determining one or more control parameters for the industrial automation device, wherein the one or more control param- (Continued)

eters are determined based at least partly on the following: the target reference value, the one or more operating limits, the operational information, and the target operating point.

18 Claims, 6 Drawing Sheets

(56) References Cited

U.S. PATENT DOCUMENTS

| | | | |
|---|---|---|---|
| 2011/0088484 A1* | 4/2011 | Camilleri | G01F 1/34 |
| | | | 73/861.42 |
| 2014/0103122 A1* | 4/2014 | Lundell | G06F 16/9554 |
| | | | 235/494 |
| 2017/0030359 A1* | 2/2017 | Fowler | F04D 15/0066 |

\* cited by examiner

DETERMINING CONTROL PARAMETERS FOR AN INDUSTRIAL AUTOMATION DEVICE

FIELD

Various exemplary embodiments relate to industrial process control.

BACKGROUND

Efficiency of an industrial process may be improved by optimizing the control parameters of an industrial automation device controlling the process. However, determining the optimal control parameters may require detailed knowledge on the industrial automation device and the process, as well as experience on how to tune the parameters. Therefore, there is a significant challenge in determining the optimal control parameters for an industrial automation device, particularly when commissioning a new industrial automation device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided a computer-implemented method comprising: obtaining, by a terminal device, a graphical representation comprising information on one or more performance metrics associated with an industrial automation device; determining, by the terminal device, a target operating point associated with the industrial automation device based at least partly on the graphical representation; obtaining, by the terminal device, a target reference value and one or more operating limits for the industrial automation device; obtaining, by the industrial automation device, operational information associated with usage of the industrial automation device; and determining, by the industrial automation device, one or more control parameters for the industrial automation device, wherein the one or more control parameters are determined based at least partly on the following: the target reference value, the one or more operating limits, the operational information, and the target operating point.

According to another aspect, there is provided an apparatus comprising means for obtaining a graphical representation comprising information on one or more performance metrics associated with an industrial automation device, determining a target operating point associated with the industrial automation device based at least partly on the graphical representation, obtaining a target reference value and one or more operating limits for the industrial automation device, obtaining operational information associated with usage of the industrial automation device, and determining one or more control parameters for the industrial automation device, wherein the one or more control parameters are determined based at least partly on the following: the target reference value, the one or more operating limits, the operational information, and the target operating point.

According to another aspect, there is provided an apparatus comprising at least one processor, and at least one memory including computer program code, wherein the at least one memory and the computer program code are configured, with the at least one processor, to cause the apparatus to: obtain a graphical representation comprising information on one or more performance metrics associated with an industrial automation device, determine a target operating point associated with the industrial automation device based at least partly on the graphical representation, obtain a target reference value and one or more operating limits for the industrial automation device, obtain operational information associated with usage of the industrial automation device, and determine one or more control parameters for the industrial automation device, wherein the one or more control parameters are determined based at least partly on the following: the target reference value, the one or more operating limits, the operational information, and the target operating point.

According to another aspect, there is provided a system comprising a terminal device and an industrial automation device, wherein the terminal device is configured to: obtain a graphical representation comprising information on one or more performance metrics associated with the industrial automation device, determine a target operating point associated with the industrial automation device based at least partly on the graphical representation, obtain a target reference value and one or more operating limits for the industrial automation device, and transmit the target operating point, the target reference value, and the one or more operating limits to the industrial automation device; and wherein the industrial automation device is configured to: receive the target operating point, the target reference value, and the one or more operating limits, obtain operational information associated with usage of the industrial automation device, and determine one or more control parameters for the industrial automation device, wherein the one or more control parameters are determined based at least partly on the following: the target reference value, the one or more operating limits, the operational information, and the target operating point.

According to another aspect, there is provided a computer program comprising instructions for causing an apparatus to perform at least the following: obtain a graphical representation comprising information on one or more performance metrics associated with an industrial automation device, determine a target operating point associated with the industrial automation device based at least partly on the graphical representation, obtain a target reference value and one or more operating limits for the industrial automation device, obtain operational information associated with usage of the industrial automation device, and determine one or more control parameters for the industrial automation device, wherein the one or more control parameters are determined based at least partly on the following: the target reference value, the one or more operating limits, the operational information, and the target operating point.

According to another aspect, there is provided a computer readable medium comprising program instructions for causing an apparatus to perform at least the following: obtain a graphical representation comprising information on one or more performance metrics associated with an industrial automation device, determine a target operating point associated with the industrial automation device based at least partly on the graphical representation, obtain a target reference value and one or more operating limits for the industrial automation device, obtain operational information associated with usage of the industrial automation device, and determine one or more control parameters for the industrial automation device, wherein the one or more control parameters are determined based at least partly on the following:

the target reference value, the one or more operating limits, the operational information, and the target operating point.

According to another aspect, there is provided a non-transitory computer readable medium comprising program instructions for causing an apparatus to perform at least the following: obtain a graphical representation comprising information on one or more performance metrics associated with an industrial automation device, determine a target operating point associated with the industrial automation device based at least partly on the graphical representation, obtain a target reference value and one or more operating limits for the industrial automation device, obtain operational information associated with usage of the industrial automation device, and determine one or more control parameters for the industrial automation device, wherein the one or more control parameters are determined based at least partly on the following: the target reference value, the one or more operating limits, the operational information, and the target operating point.

BRIEF DESCRIPTION OF THE DRAWINGS

In the following, various exemplary embodiments will be described in greater detail with reference to the accompanying drawings, in which.

DETAILED DESCRIPTION

The following embodiments are exemplary. Although the specification may refer to "an", "one", or "some" embodiment(s) in several locations of the text, this does not necessarily mean that each such reference is made to the same embodiment(s), or that a particular feature only applies to a single embodiment. Single features of different embodiments may also be combined to provide other embodiments.

Various exemplary embodiments may be applicable to any process in an industrial plant, including a processing system and/or an industrial manufacturing related process and/or a system for a technical process, which is at least partly automated, providing different measured/sensored values for a plurality of variables on one or more devices (equipment) and/or on one or more processes. A non-limiting list of examples includes power plants, pulp and paper plants, manufacturing plants, chemical processing plants, power transmission systems, mining and mineral processing plants, oil and gas systems, data centers, ships, and transportation fleet systems.

Different embodiments and examples are described below using single units, models, equipment and memory, without restricting the embodiments/examples to such a solution. Concepts called cloud computing and/or virtualization may be used. Virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN) may cause one or more of the functionalities described below to be migrated to any corresponding abstraction or apparatus or device. Therefore, all words and expressions should be interpreted broadly, and they are intended to illustrate, not to restrict, the exemplary embodiments.

Figure 1:
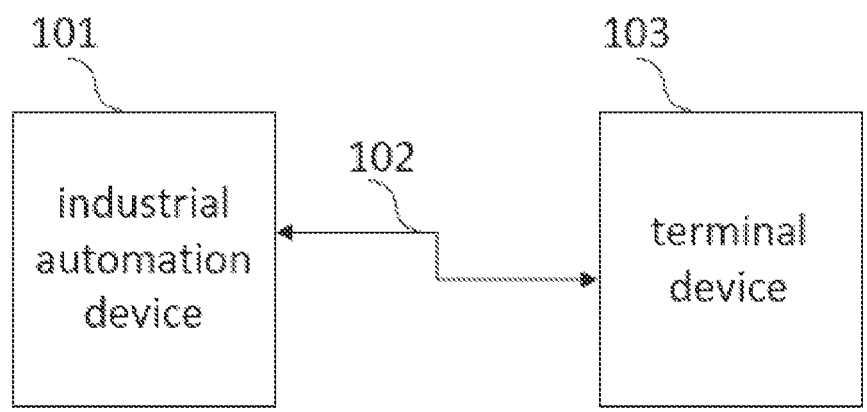
FIG. 1 illustrates a simplified architecture of a system.

FIG. 1 illustrates a system according to an exemplary embodiment, in which a terminal device 103 is able to connect to one or more industrial automation devices 101 via a connection 102. It should be noted that FIG. 1 illustrates a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for communication are irrelevant to the exemplary embodiments. Therefore, they need not be discussed in more detail here.

The industrial automation device 101 may comprise a frequency converter, variable frequency drive, variable speed drive, motion drive, motion controller, motor, servomotor, AC/DC module, DC/AC module, DC/DC module, programmable logic controller (PLC), switch, soft starter, robot, or any other device used for industrial automation. A variable speed drive comprises a variable speed AC or DC electric motor. The industrial automation device, for example a variable speed drive, may be used to run machinery, for example one or more pumps, fans or compressors, at different speeds. The machinery may be mechanically and/or electrically connected to the industrial automation device. The industrial automation device 101 may comprise a controller configured to measure currents and voltages in the industrial automation device, as well as mechanical variables such as speed of the associated machinery processing an industrial process. For example, the controller may comprise a proportional-integral-derivative, PID, controller. The controller may be further configured to send control signals to the process. The industrial automation device may control highly dynamic processes, in which for example the speed or the torque applied to the machinery has to be varied according to the needs of the process.

The industrial automation device 101 may be equipped with a short-range radio interface, for example Bluetooth. The industrial automation device 101 may store, for example in an internal memory of the industrial automation device, information on control parameter settings, for example present values of parameters such as controller gains, ramp times, motor data, limits, magnetization settings, signal filtering settings, and/or motor control settings. The industrial automation device 101 may also store operational information recorded during the operation of the industrial automation device, for example observed technical performance information such as information on key performance indicators, for example load current histogram, torque ripple, torque vs. speed curves, and/or power vs. speed curves, and/or other information such as resonance frequencies, load inertias, and/or external information regarding the industrial automation device and/or the device, process or system that the industrial automation device is controlling. The industrial automation device 101 may be configured to transmit the operational information recorded during the operation of the industrial automation device, which may also be referred to as technical operational information on the usage of the industrial automation device, and the information on the control parameter settings. The industrial automation device 101 may be further configured to receive user-adjustable input parameters, for example a target speed, from the terminal device 103 via the connection 102.

The terminal device 103 may comprise a user equipment such as a smartphone, mobile phone, tablet computer or laptop computer. The terminal device 103 may be a local device located on-site at a close proximity to the industrial automation device 101. The terminal device 103 may be equipped with a short-range radio interface, for example Bluetooth. The terminal device 103 may be configured to receive the operational information and the information on the user-adjustable input parameters from the industrial automation device 101 via the connection 102. The terminal device 103 may be further configured to transmit user-adjustable input parameters to the industrial automation device 101 via the connection 102. The connection 102 of the local terminal device 103 to the industrial automation device 101 may be provided for example by Bluetooth, Bluetooth low energy, ZigBee, wireless local area network (WLAN or WiFi), wireless mesh network, near field communication (NFC), or by a wired link.

In another exemplary embodiment, the connection between the industrial automation device and the terminal device may be a remote connection for example via the internet. A connection to the internet from the industrial automation device and the terminal device may be provided by a cellular, wireless or wired link.

In another exemplary embodiment, the terminal device may be connected to a controller, for example a programmable logic controller, PLC, controlling the industrial automation device.

In another exemplary embodiment, the terminal device may be connected to the industrial automation device via a gateway device.

Figure 2:
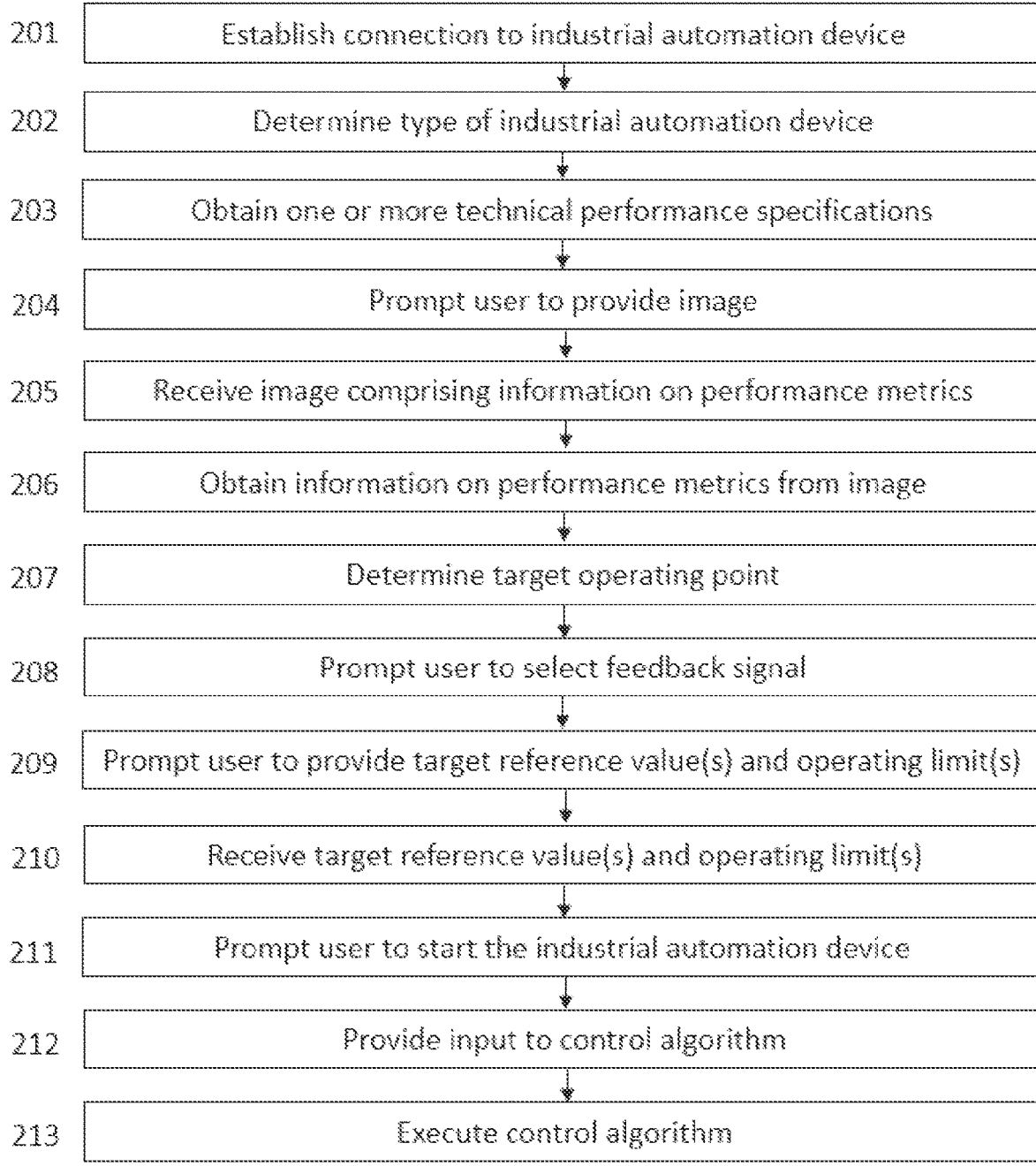
FIG. 2 illustrates a flow chart according to an exemplary embodiment.

FIG. 2 illustrates a flow chart according to an exemplary embodiment. A terminal device establishes 201 a connection, for example a Bluetooth connection, with an industrial automation device. The terminal device may be configured to scan the available industrial automation devices, display a list of the available industrial automation devices to a user, and the user may then select an industrial automation device to connect to from the list. The list of the available industrial automation devices may comprise identifying information on the industrial automation devices, for example a unique address or a device name, possibly combined with a site name. The user of the terminal device may be required to enter a PIN code and/or other authentication information before the connection is established.

The terminal device reads device information of the connected industrial automation device via the connection and determines 202 the type of the industrial automation device based on the device information. The device type information may be used to obtain 203 one or more technical performance specifications, for example a maximum output current limit, of the industrial automation device for example from an internal memory of the terminal device or from an external database, such as a cloud database.

The terminal device then prompts 204 the user, for example via a graphical user interface, to provide an image of a cost function, i.e. a graphical representation such as a curve comprising information on one or more performance metrics of the industrial automation device, and/or an associated device, process or system that the industrial automation device is controlling. For example, a camera in the terminal device may be used to obtain a digital image of the cost function from a data sheet or a user manual, which may be on a paper sheet or on an electronic visual display. Alternatively, the image may be provided as a screenshot from an electronic user manual, for example. The image may be, for example, a joint photographic experts group, JPEG, file, a portable network graphics, PNG, file, a graphics interchange format, GIF, file, or a portable document format, PDF, file.

An example of a cost function is a pump curve, which may also be referred to as a pump performance curve. The pump curve is a graphical representation of the performance metrics of a pump. The pump curve may comprise information such as the head (pressure) produced by the pump as a function of flow rate through the pump, wherein the produced head declines as flow increases. There may be a plurality of pump performance curves in the same image for different impeller diameters, speeds, efficiency and/or power consumption of the pump. The head capacity and the flow rate capacity of the pump can be increased by increasing the impeller diameter or speed. The image may also comprise a system curve representing the operation of the flow system in which the pump is being applied. In other words, the system curve represents the resistance offered by the flow system, i.e. head losses as a function of flow rate. An operating point for the pump can be obtained from the intersection of the system curve and a pump performance curve.

After receiving 205 the image comprising the cost function, the terminal device provides the image comprising the cost function to an image recognition algorithm. The image recognition algorithm may be executed for example in the terminal device. Alternatively, the image recognition algorithm may be executed for example in a cloud service. The user may be prompted to provide additional information on the cost function, for example to define the axes and/or scale factors, as the graph may be for example in linear or logarithmic scale. The image recognition algorithm then recognizes the cost function from the image, and obtains 206 from it a set of data points comprising information on the performance metrics, for example by reading the curves, the range of the x and y axes, and the units of the cost function. The optimal target operating point of the industrial automation device, and/or a device, process or system, for example a pump, that the industrial automation device is controlling, may then be determined 207 based on the information obtained from the cost function and the previously obtained one or more technical performance specifications of the industrial automation device.

The terminal device prompts 208 the user to select, for example from a pre-defined list in a graphical user interface, a feedback signal from the industrial automation device. The feedback signal may be used to provide operational information on the usage of the industrial automation device and/or an associated industrial process. The operational information may comprise measured values for one or more variables, for example pressure, temperature, and/or flow, indicated by the user.

The terminal device prompts 209 the user, for example via a graphical user interface, to enter further input parameters, such as one or more target reference values for one or more variables associated with the industrial automation device, as well as operating limits, which may be in the form of minimum and maximum limits for example for flow, pressure, temperature, speed, and/or torque. The one or more target reference values may be used to define one or more target outputs, for example a required speed, for the industrial automation device. After receiving 210 the further input parameters entered by the user, the terminal device prompts 211 the user, for example via a graphical user interface, to start the industrial automation device.

After the industrial automation device is started, the information obtained from the cost function and the further input parameters entered by the user, as well as the operational information provided by the feedback signal, are provided 212 as input to a control algorithm. The control algorithm is executed 213 to determine one or more control parameters for the industrial automation device based on the input provided to the control algorithm. In other words, the control algorithm controls the output(s) of the industrial automation device based on the input provided to the control algorithm. The control algorithm may execute control actions on the industrial automation device to steer the process towards the optimal target operating point by reading the feedback signal and adjusting the operation of the industrial automation device, for example speed, power and/or torque, within the operating limits and based on the other provided input parameters. For example, the control algorithm may adjust the torque and/or speed of a variable speed drive controlling a pump to match the information obtained from the pump curve in order to produce optimal flow and efficiency for the pump. The control algorithm may be comprised for example in the industrial automation device. Alternatively, the control algorithm may be comprised for example in the terminal device, or in an edge device, or in a cloud service.

Figure 3:
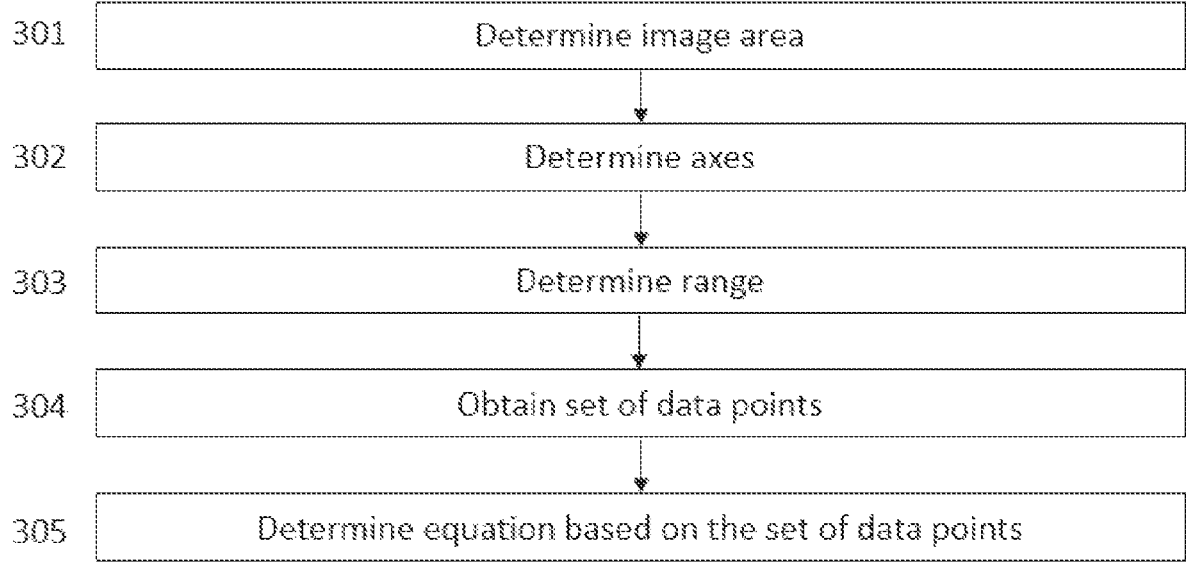
FIG. 3 illustrates a flow chart according to an exemplary embodiment.

FIG. 3 illustrates a flow chart according to an exemplary embodiment comprising an image recognition algorithm. In step 301, the image recognition algorithm determines the image area comprising the cost function, for example a pump curve. The image recognition algorithm may automatically recognize the image area comprising the pump curve by using a pre-defined reference library or database comprising examples of pump curves, to which the provided image may be compared by the algorithm in order to recognize the pump curve from the image. In the identification process, levels of confidence may be determined for example by using matching scores quantifying the extent of resemblance between the identified pump curve and respective reference example(s). If the matching score is below a pre-determined threshold value, for example a warning may be displayed to the user. Alternatively, the image recognition algorithm may prompt the user to define the image area comprising the pump curve.

In step 302, the image recognition algorithm determines the axes and units of the pump curve. For example, the y axis may be determined to indicate head as meters, and the x axis may be determined to indicate flow rate as liters per second. The image recognition algorithm may automatically recognize the axes, or prompt a user to define the axes.

In step 303, the image recognition algorithm determines the range of the axes. The image recognition algorithm may automatically recognize the range of the axes, or prompt a user to define the range of the axes.

In step 304, the image recognition algorithm obtains a set of data points from the image pixels of the curve. The set of data points may comprise for example flow rate values, corresponding head values, and/or corresponding efficiency values. Furthermore, the user may be prompted to confirm whether the obtained data is correct, and/or given an option to edit the data.

In step 305, the image recognition algorithm determines the pump curve equation corresponding with the image for example by using curve fitting to fit the obtained set of data points to pre-defined pump curve equations, and selects the pump curve equation that has the best fit to the obtained set of data points. In other words, the pump curve is parameterized in order to provide input parameters to the control algorithm.

The control algorithm may be an optimal control algorithm, for example based on model predictive control, MPC. MPC is an advanced method of process control that may be used to control a process while satisfying a set of constraints, for example operating limits. MPC may use a mathematical model of the industrial automation device, a cost function, and an optimization algorithm minimizing the cost function using a control input. The mathematical model may be adapted for predicting the electrical and/or mechanical behaviour of the industrial automation device in response to changing input variables and output reference variables. The mathematical model may be based on physical equations reflecting the electrical and/or mechanical properties of the industrial automation device. More precisely, MPC may use current process measurements, current dynamic state of the process, the mathematical model and an optimization algorithm to determine one or more control actions to be performed for N-step ahead predictions, and repeats this functionality to compensate mismatch between the predictions and the measured result(s) in the process.

Figure 4:
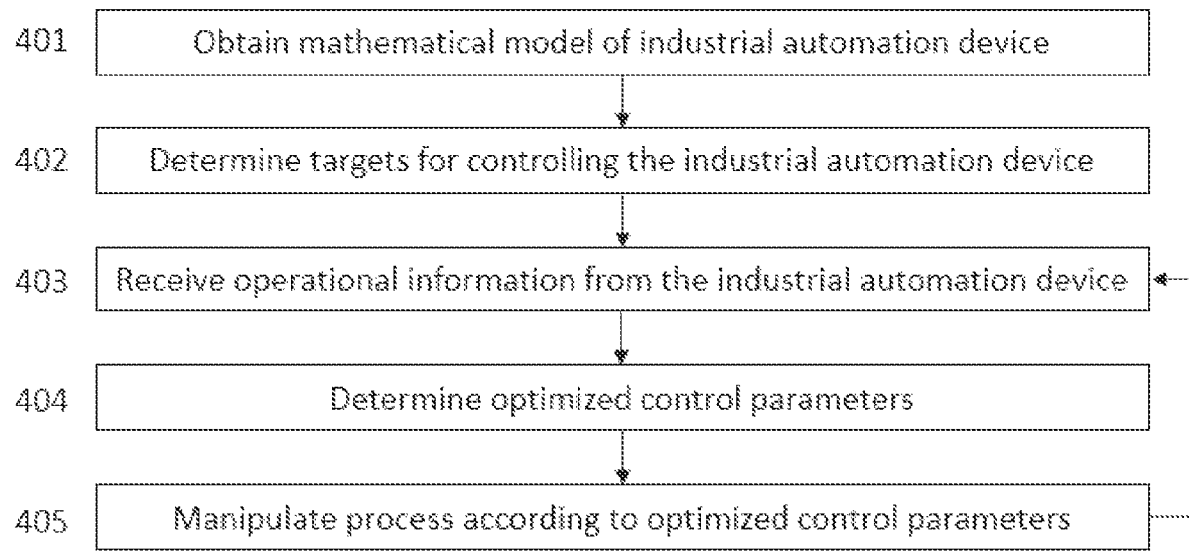
FIG. 4 illustrates a flow chart according to an exemplary embodiment.

FIG. 4 illustrates a flow chart according to an exemplary embodiment comprising a closed loop control scheme using an MPC control algorithm. For example, the control algorithm may be comprised in an industrial automation device. In step 401, a mathematical model of the industrial automation device is provided to the control algorithm. A pre-configured mathematical model may be obtained for example from a database based on the type of the industrial automation device. The pre-configured mathematical model may be provided for example by the manufacturer of the industrial automation device.

In step 402, the objectives and/or targets, such as a target operating point, of the control scheme are determined. For example, the objectives and/or targets may be received from a terminal device connected to the industrial automation device. In addition, the user of the terminal device may select one or more variables to be controlled, and set a target reference value for the one or more variables. The user may also set constraints, for example operating limits, for the industrial automation device and/or process.

After the industrial automation device is started, in step 403 the control algorithm receives operational information, i.e. measured values of one or more variables, for example speed and/or torque, provided by a feedback signal from the industrial automation device, or from an industrial process that the industrial automation device is controlling. The feedback signal may be selected by the user.

In step 404, the mathematical model of the industrial automation device is used to predict the states and outputs of the industrial automation device over a finite-time horizon, and an optimization problem is solved based on the constraints set in step 402 in order to determine optimized control parameters for the industrial automation device. For example, the optimization problem may be formulated in the form of a quadratic optimization problem, and quadratic programming solution methods can be used to solve the problem.

In step 405, the optimized control parameters are applied to the industrial automation device in order to control the industrial automation device with said optimized control parameters, and thus manipulate the process in order to drive it towards the optimal target operating point.

In order to further tune the control parameters, the control scheme may be iterative so that after step 405, the control scheme returns to step 403 to receive new measured values after the optimized control parameters have been applied to the industrial automation device. New optimized control parameters may then be determined and applied to the industrial automation device to drive the process even closer to the optimal target operating point. In the long run, the optimal target operating point of the process may thus be achieved.

Furthermore, when the operating conditions of the device/ process/system change due to wear or changes in the operating environment, the optimization procedure may be executed again to achieve the new optimal operating point. For example, the user may trigger the optimization procedure to be executed again.

Figure 5:
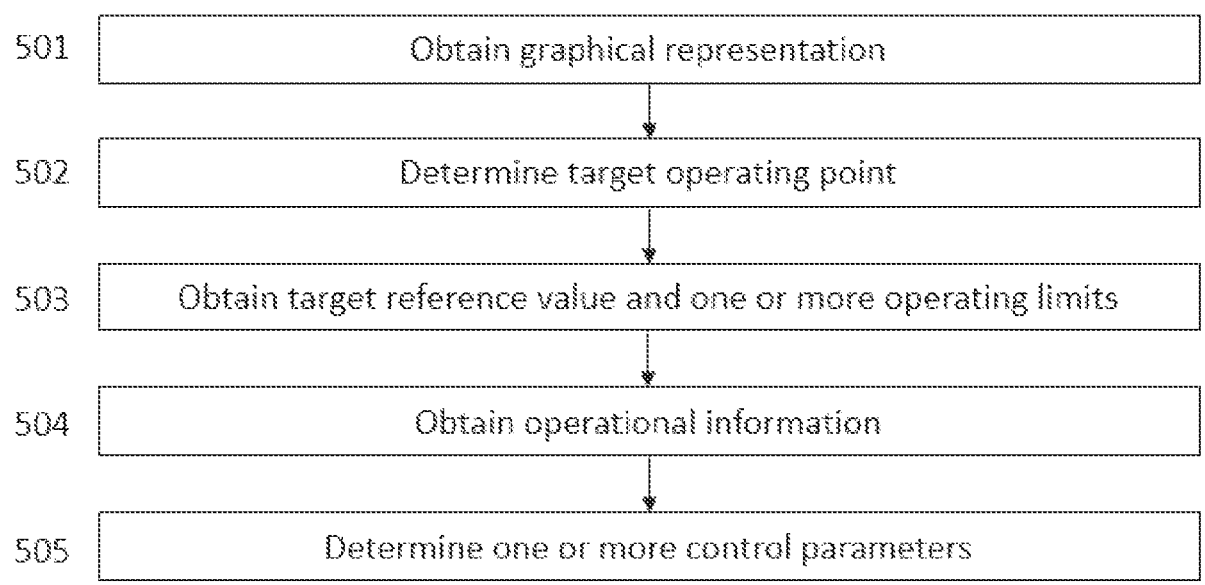
FIG. 5 illustrates a flow chart according to an exemplary embodiment.

FIG. 5 illustrates a flow chart according to an exemplary embodiment. In step 501, a graphical representation comprising information on one or more performance metrics associated with an industrial automation device is obtained for example by prompting a user to provide the graphical representation. For example, the graphical representation may comprise a pump performance curve and a system curve, wherein the pump performance curve comprises information on one or more performance metrics associated with a pump controlled by the industrial automation device. In step 502, a target operating point associated with the industrial automation device is determined based at least partly on the graphical representation. For example, the target operating point may be associated with the pump controlled by the industrial automation device, and the target operating point may be determined based on the intersection of the pump performance curve and the system curve. In step 503, a target reference value and one or more operating limits for the industrial automation device are obtained for example by prompting a user to enter the target reference value and the one or more operating limits. In step 504, operational information associated with usage of the industrial automation device is obtained from the industrial automation device. In step 505, one or more control parameters, i.e. values of the one or more control parameters, for the industrial automation device are determined, wherein the one or more control parameters are determined based at least partly on the following: the target reference value, the one or more operating limits, the operational information, and the target operating point.

The functions and/or blocks described above by means of FIGS. 2-5 are in no absolute chronological order, and some of them may be performed simultaneously or in an order differing from the described one. Other functions and/or blocks may also be executed between them or within them.

Figure 6:
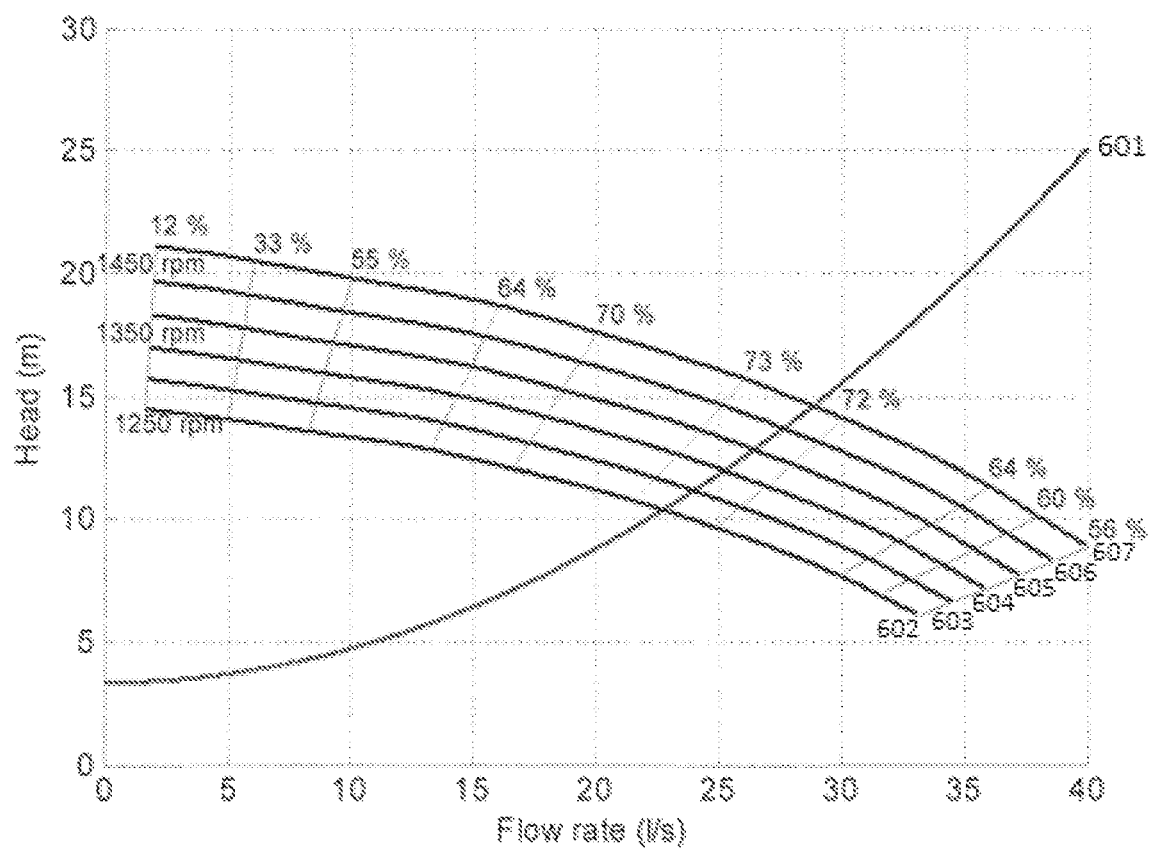
FIG. 6 illustrates an example of a graphical representation comprising a set of pump performance curves.

FIG. 6 illustrates an example of a graphical representation comprising a set of pump performance curves 602, 603, 604, 605, 606, 607 and a system curve 601. The pump performance curves represent the head produced by the pump as a function of flow rate through the pump at different rotational speeds. The operating points of the pump are situated at the intersections of the system curve and the pump performance curves. The example of FIG. 6 also comprises information on the efficiency of the pump.

A technical advantage provided by various exemplary embodiments is that the efficiency of an industrial automation device and/or an associated industrial process may be improved. In addition, the optimal operating point and control parameters of an industrial automation device and/or an associated industrial process may be determined automatically, instead of having to define them manually by a user. Furthermore, the optimal operating point may be achieved more accurately and/or faster.

Figure 7:
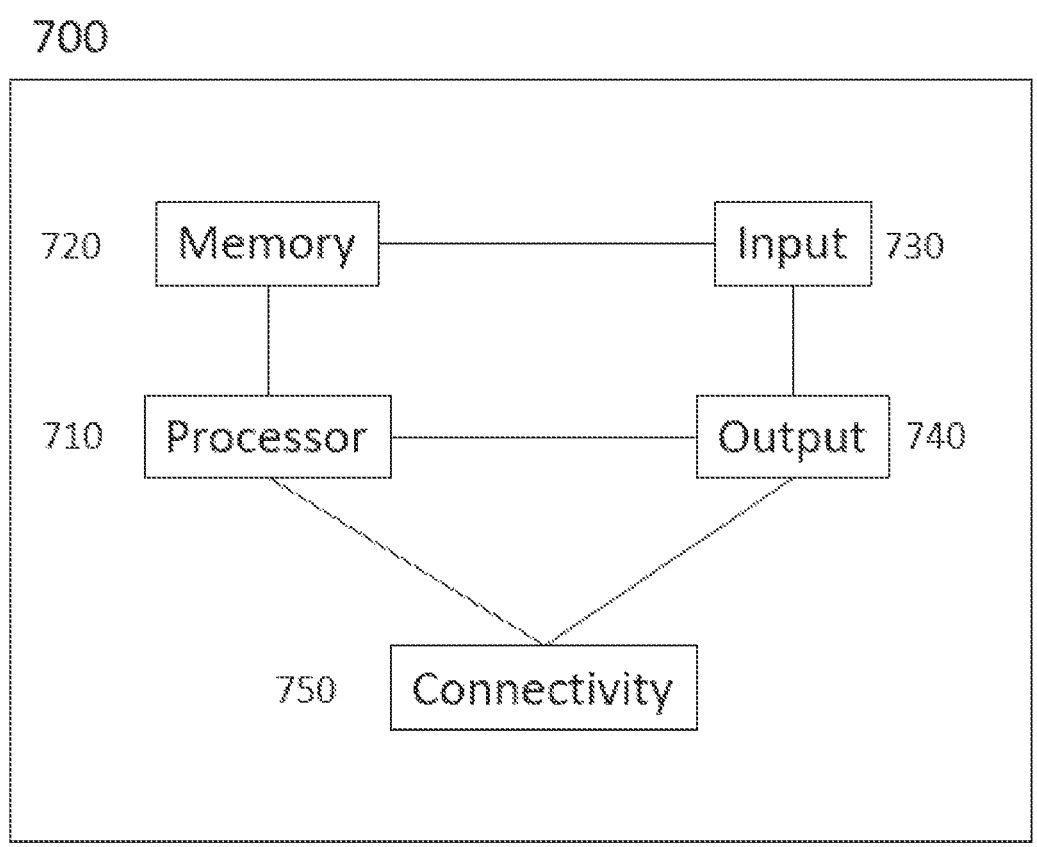
FIG. 7 illustrates an apparatus according to an exemplary embodiment.

FIG. 7 illustrates an apparatus 700, which may be an apparatus such as, or comprised in, a terminal device, according to an exemplary embodiment. The apparatus 700 comprises a processor 710. The processor 710 interprets computer program instructions and processes data. The processor 710 may comprise one or more programmable processors. The processor 710 may comprise programmable hardware with embedded firmware and may, alternatively or additionally, comprise one or more application specific integrated circuits, ASICs.

The processor 710 is coupled to a memory 720. The processor is configured to read and write data to and from the memory 720. The memory 720 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 720 stores computer readable instructions that are executed by the processor 710. For example, non-volatile memory stores the computer readable instructions and the processor 710 executes the instructions using volatile memory for temporary storage of data and/or instructions.

The computer readable instructions may have been pre-stored to the memory 720 or, alternatively or additionally, they may be received, by the apparatus, via electromagnetic carrier signal and/or may be copied from a physical entity such as computer program product. Execution of the computer readable instructions causes the apparatus 700 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 700 further comprises, or is connected to, an input unit 730. The input unit 730 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 730 may comprise an interface to which external devices may connect to.

The apparatus 700 also comprises an output unit 740. The output unit comprises or is connected to one or more displays capable of rendering visual content such as a light emitting diode, LED, display, a liquid crystal display, LCD and a liquid crystal on silicon, LCoS, display. The output unit 740 may comprise two displays to render stereoscopic visual content. One display to render content to the left eye and the other display to render content to the right eye. The output unit 740 may further comprise a transmission unit, such as one or more waveguides or one or more lenses, to transfer the rendered visual content to the user's field of view. The output unit 740 may further comprise one or more audio outputs. The one or more audio outputs may be for example loudspeakers or a set of headphones.

The apparatus 700 may further comprise a connectivity unit 750. The connectivity unit 750 enables wired and/or wireless connectivity to external networks and/or devices. The connectivity unit 750 may comprise one or more antennas and one or more receivers that may be integrated to the apparatus 700 or the apparatus 700 may be connected to. The connectivity unit 750 may comprise an integrated circuit or a set of integrated circuits that provide the wireless communication capability for the apparatus 700. Alternatively, the wireless connectivity may be a hardwired application specific integrated circuit, ASIC.

It is to be noted that the apparatus 700 may further comprise various components not illustrated in FIG. 7. The various components may be hardware components and/or software components.

As used in this application, the term "circuitry" may refer to one or more or all of the following:
a. hardware-only circuit implementations (such as implementations in only analog and/or digital circuitry) and
b. combinations of hardware circuits and software, such as (as applicable):
   i. a combination of analog and/or digital hardware circuit(s) with software/firmware and
   ii. any portions of hardware processor(s) with software (including digital signal processor(s)), software, and memory(ies) that work together to cause an apparatus, such as a mobile phone, to perform various functions) and
c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given drawings, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. A computer-implemented method comprising:
obtaining a graphical representation comprising information on one or more performance metrics associated with an industrial automation device;
obtaining the information on the one or more performance metrics associated with the industrial automation device from the graphical representation using an image recognition algorithm;
using the image recognition algorithm to determine an axis of the graphical representation;
using the image recognition algorithm to identify a relevant set of data points of the graphical representation;
using the image recognition algorithm to determine a target operating point associated with the industrial automation device based at least partly on the graphical representation using a relation of the relevant set of data points to the axis of the graphical representation;
obtaining a target reference value and one or more operating limits for the industrial automation device;
obtaining operational information associated with usage of the industrial automation device; and
determining one or more control parameters for the industrial automation device, wherein the one or more control parameters are determined based at least partly on the following: the target reference value, the one or more operating limits, the operational information, and the target operating point.

2. The method of claim 1, further comprising:
determining a type of the industrial automation device;
obtaining one or more technical performance specifications of the industrial automation device based on the type of the industrial automation device;
wherein the target operating point is determined based at least partly on the one or more technical performance specifications.

3. The method of claim 1, wherein the operational information comprises measured values for one or more variables indicated by a user.

4. The method of claim 1, further comprising prompting the user to provide the graphical representation.

5. The method of claim 1, further comprising prompting the user to start the industrial automation device.

6. The method of claim 1, wherein the one or more control parameters are used to control the industrial automation device.

7. The method of claim 1, wherein model predictive control is used to optimize the one or more control parameters.

8. The method of claim 1, wherein the target reference value is a target reference value for speed.

9. The method of claim 1, wherein the industrial automation device comprises a variable speed drive.

10. The method of claim 1, wherein the graphical representation comprises one or more pump performance curves for a pump controlled by the industrial automation device.

11. The method of claim 10, wherein the target operating point is for the pump controlled by the industrial automation device.

12. The method of claim 1, comprising fitting the relevant set of data points to a curve and selecting a performance curve equation based on the fitting of the relevant set of data points to the curve.

13. A system comprising at least a terminal device and an industrial automation device;
wherein the terminal device is configured to:
obtain a graphical representation comprising information on one or more performance metrics associated with the industrial automation device;
obtain the information on the one or more performance metrics associated with the industrial automation device from the graphical representation using an image recognition algorithm;
use the image recognition algorithm to determine an axis of the graphical representation;
use the image recognition algorithm to identify a relevant set of data points of the graphical representation;
use the image recognition algorithm to determine a target operating point associated with the industrial automation device based at least partly on the graphical representation using a relation of the relevant set of data points to the axis of the graphical representation;
obtain a target reference value and one or more operating limits for the industrial automation device;
transmit the target operating point, the target reference value, and the one or more operating limits to the industrial automation device;
wherein the industrial automation device is configured to:
receive the target operating point, the target reference value, and the one or more operating limits from the terminal device;
obtain operational information associated with usage of the industrial automation device; and
determine one or more control parameters for the industrial automation device, wherein the one or more control parameters are determined based at least partly on the following: the target operating point, the target reference value, the one or more operating limits, and the operational information.

14. The system of claim 13, wherein the terminal device is further configured to:
fit the relevant set of data points to a curve and select a performance curve equation based on the fitting of the relevant set of data points to the curve.

15. An apparatus comprising at least one processor, and at least one memory including computer program code, wherein the at least one memory and the computer program code are configured, with the at least one processor, to cause the apparatus to:
obtain a graphical representation comprising information on one or more performance metrics associated with an industrial automation device;
obtain the information on the one or more performance metrics associated with the industrial automation device from the graphical representation using an image recognition algorithm;
use the image recognition algorithm to determine an axis of the graphical representation;
use the image recognition algorithm to identify a relevant set of data points of the graphical representation;
use the image recognition algorithm to determine a target operating point associated with the industrial automation device based at least partly on the graphical representation using a relation of the relevant set of data points to the axis of the graphical representation;
obtain a target reference value and one or more operating limits for the industrial automation device;
obtain operational information associated with usage of the industrial automation device; and
determine one or more control parameters for the industrial automation device, wherein the one or more control parameters are determined based at least partly on the following: the target reference value, the one or more operating limits, the operational information, and the target operating point.

16. The apparatus of claim 15, wherein the computer program code are configured, with the at least one processor, to cause the apparatus to:
fit the relevant set of data points to a curve and select a performance curve equation based on the fitting of the relevant set of data points to the curve.

17. A non-transitory computer readable medium comprising program instructions for causing an apparatus to perform at least the following:
obtain a graphical representation comprising information on one or more performance metrics associated with an industrial automation device;
obtain the information on the one or more performance metrics associated with the industrial automation device from the graphical representation using an image recognition algorithm;
use the image recognition algorithm to determine an axis of the graphical representation;
use the image recognition algorithm to identify a relevant set of data points of the graphical representation;
use the image recognition algorithm to determine a target operating point associated with the industrial automation device based at least partly on the graphical representation using a relation of the relevant set of data points to the axis of the graphical representation;
obtain a target reference value and one or more operating limits for the industrial automation device;
obtain operational information associated with usage of the industrial automation device; and
determine one or more control parameters for the industrial automation device, wherein the one or more control parameters are determined based at least partly on the following: the target reference value, the one or more operating limits, the operational information, and the target operating point.

18. The non-transitory computer readable medium of claim 17, comprising program instructions for causing an apparatus to perform at least the following:

fit the relevant set of data points to a curve and select a performance curve equation based on the fitting of the relevant set of data points to the curve.

\* \* \* \* \*